(12) United States Patent
Zhou et al.

(10) Patent No.: US 11,910,100 B2
(45) Date of Patent: Feb. 20, 2024

(54) DETECTION CIRCUIT, DEVICE AND METHOD FOR DETECTING LIGHT SOURCE FLICKER, AND PHOTOELECTRIC DETECTION DEVICE

(71) Applicant: OPPLE LIGHTING CO., LTD., Shanghai (CN)

(72) Inventors: Zhixian Zhou, Shanghai (CN); Yalong Liu, Shanghai (CN); Jun Wu, Shanghai (CN)

(73) Assignee: OPPLE LIGHTING CO., LTD., Shanghai (CN)

( * ) Notice: Subject to any disclaimer, the term of this patent is extended or adjusted under 35 U.S.C. 154(b) by 270 days.

(21) Appl. No.: 17/384,931

(22) Filed: Jul. 26, 2021

(65) Prior Publication Data

US 2021/0352203 A1    Nov. 11, 2021

Related U.S. Application Data

(63) Continuation of application No. PCT/CN2019/130453, filed on Dec. 31, 2019.

(30) Foreign Application Priority Data

Jan. 25, 2019   (CN) .......................... 201910073284.X
Jan. 25, 2019   (CN) .......................... 201920136836.2

(51) Int. Cl.
*H04N 23/745* (2023.01)
*G01J 1/44* (2006.01)

(52) U.S. Cl.
CPC .............. *H04N 23/745* (2023.01); *G01J 1/44* (2013.01); *G01J 2001/444* (2013.01)

(58) Field of Classification Search
CPC ..... H04N 23/745; G01J 1/44; G01J 2001/444
See application file for complete search history.

(56) References Cited

U.S. PATENT DOCUMENTS 7,502,054 B2 *   3/2009   Kalapathy .............. H04N 23/70
                                                   348/370
7,538,799 B2 *   5/2009   Yanof .................... H04N 23/71
                                                   348/226.1
(Continued)

FOREIGN PATENT DOCUMENTS

CN        103267627 A       8/2013
CN        103487238 A       1/2014
(Continued)

OTHER PUBLICATIONS

International Search Report of PCT Application No. PCT/CN2019/130453 dated Mar. 26, 2020 with English translation, (6p).

*Primary Examiner* — Shahbaz Nazrul
(74) *Attorney, Agent, or Firm* — Arch & Lake LLP

(57) ABSTRACT

A detection circuit, a method for detecting light source flicker, a device for detecting light source flicker, and a photoelectric detection device are provided by the examples of the present disclosure, and the detection circuit includes a power supply; a photodiode configured to output a current based on a light source; a driving circuit connected in series with the photodiode and configured to generate an output voltage based on the current output by the photodiode, a current output by the power supply, and a resistive component, the driving circuit includes a plurality of circuits with different illumination correlation coefficients; and a control unit connected with the driving circuit and configured to select a circuit with a matched illumination correlation coefficient from the driving circuit to control the output voltage within a designate voltage range.

13 Claims, 4 Drawing Sheets

(56) References Cited

U.S. PATENT DOCUMENTS

| | | | | |
|---|---|---|---|---|
| 2009/0147103 A1* | 6/2009 | Chao | ............... | H04N 25/53 |
| | | | | 348/226.1 |
| 2011/0157415 A1* | 6/2011 | Goh | ............... | H04N 23/745 |
| | | | | 348/226.1 |
| 2016/0374574 A1* | 12/2016 | Finlinson | ............... | G01J 1/44 |
| | | | | 600/479 |
| 2017/0238826 A1* | 8/2017 | Finlinson | ............... | H03K 5/003 |

FOREIGN PATENT DOCUMENTS

| | | |
|---|---|---|
| CN | 105445677 A | 3/2016 |
| CN | 105628341 A | 6/2016 |
| CN | 207066720 U | 3/2018 |
| CN | 109540479 A | 3/2019 |
| CN | 209182000 U | 7/2019 |
| WO | 2018226516 A1 | 12/2018 |

\* cited by examiner

DETECTION CIRCUIT, DEVICE AND METHOD FOR DETECTING LIGHT SOURCE FLICKER, AND PHOTOELECTRIC DETECTION DEVICE

CROSS-REFERENCE TO RELATED APPLICATIONS

This application is based upon and claims the priority of PCT patent application No. PCT/CN2019/130453 filed on Dec. 31, 2019 which claims priority to the Chinese patent application No. 201910073284.X filed on Jan. 25, 2018 and the Chinese patent application No. 201920136836.2 filed on Jan. 25, 2018, the entire contents of which are hereby incorporated by reference herein for all purposes.

TECHNICAL FIELD

The present disclosure relates to a technical field of photoelectric detection, and particularly relates to a detection circuit, a device and a method for detecting light source flicker.

BACKGROUND

Light source flicker refers to the characteristics of a light source that the illumination and brightness changes correspondingly with the periodic change of current amplitude upon being driven by alternating current (AC) or pulse direct-current (DC) power supply.

SUMMARY

Examples of the present disclosure provide a detection circuit, a device and a method for detecting light source flicker.

According to a first aspect, a detection circuit is provided. The detection circuit may include a power supply; a photodiode configured to output a current based on a light source; a driving circuit connected in series with the photodiode and configured to generate an output voltage based on the current output by the photodiode, a current output by the power supply, and a resistive component, the driving circuit includes a plurality of circuits with different illumination correlation coefficients; and a control unit connected with the driving circuit and configured to select a circuit with a matched illumination correlation coefficient from the driving circuit to control the output voltage within a designate voltage range.

In a second aspect, a device for detecting light source flicker is provided, which may include the detection circuit according to the first aspect; a V(λ) filter arranged on a light receiving surface of the photodiode of the detection circuit and configured to filter the light source detected by the detection circuit; and a calculation unit configured to determine a light source flicker parameter for characterizing the light source according to the output voltage of the driving circuit of the detection circuit.

In a third aspect, a method for detecting light source flicker is provided. The method may include: determining a target circuit from a driving circuit according to whether a output voltage of the driving circuit meets a designate voltage range, in which the target circuit may include at least one of the plurality of circuits, and the designate voltage range is determined based on a power supply voltage of a circuit connected with the photodiode in the driving circuit; determining the output voltage of the driving circuit upon the target circuit being connected with the photodiode; and determining a light source flicker parameter for characterizing light source according to the output voltage of the driving circuit.

It is to be understood that both the foregoing general description and the following detailed description are exemplary and explanatory only and are not restrictive of the present disclosure.

BRIEF DESCRIPTION OF THE DRAWINGS

The drawings described here are used to provide a further understanding of the present disclosure and constitute a part of the present disclosure. The illustrative examples of the present disclosure and their descriptions are used to explain the present disclosure, and do not constitute an improper limitation of the present disclosure. In the drawings.

DETAILED DESCRIPTION

The technical solutions of the examples will be described in a clearly and fully understandable way in connection with the drawings related to the examples of the present disclosure. Apparently, the described examples are just a part but not all of the examples of the present disclosure. Based on the examples of the present disclosure, those skilled in the art can acquire other example(s), without any inventive work, which should be within the scope of the disclosure.

When the light source flickers, the light source will flicker, thus causing harm to human eyes. With the popularization of LED lighting products and people's attention to lighting health, people pay more and more attention to the influence of light source flicker on human body, and accordingly, how to detect the light source flicker has also received more and more attention. Therefore, a detection scheme of the light source flicker is needed, so as to achieve the detection of the light source flicker.

Figure 1:
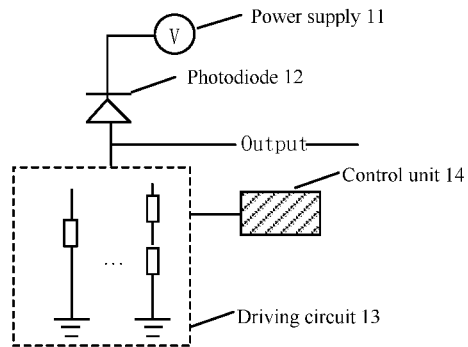
FIG. 1 is a first module schematic diagram of a detection circuit provided by an example of the present disclosure.

Refer to FIG. 1, FIG. 1 is a first module schematic diagram of a detection circuit provided by an example of the present disclosure. As illustrated by FIG. 1, the circuit includes the following modules: a power supply 11, a photodiode 12, a driving circuit 13 and a control unit 14.

In at least one example of the present disclosure, the power supply 11 may be connected with the photodiode 12, and in one example, the power supply 11 may be connected with a cathode of the photodiode 12.

In the case where the power supply 11 is connected with the cathode of the photodiode 12, if the photodiode 12 is in a conducting state, such as an optical signal sampling state, the current output by the power supply 11 can pass through the photodiode 12. If the photodiode 12 is in a non-conducting state, the current output by the power supply 11 may not pass through the photodiode 12.

The power supply 11 can be connected with the driving circuit 13 and the control unit 14 through the photodiode 12. In the case where the power supply 11 is connected with the cathode of the photodiode 12, if the photodiode 12 is in the conducting state, the current output by the power supply 11 can be input to the driving circuit 13 and the control unit 14 through the photodiode 12; if the photodiode 12 is in the non-conducting state, the current output by the power supply 11 cannot be input to the driving circuit 13 and the control unit 14.

In at least one example of the present disclosure, upon being in the conducting state, the photodiode 12 can output a current based on the light source, that is, the photodiode 12 can sample an optical signal of the light source and convert the optical signal as sampled into an electrical signal, so as to generate a current.

In an example, the photodiode 12 may include a photodiode of which a wavelength range of spectral response ranging from 380 nm (nanometer) to 780 nm and a response speed is not more than 100 ns (nanosecond).

In an example, the photodiode 12 may include a photodiode of which the wavelength range of spectral response ranges from 400 nm to 730 nm, or ranges from 420 nm to 700 nm, and the response speed is not more than 100 ns (nanosecond).

In another example, the photodiode 12 may include a photodiode of which the wavelength range of spectral response ranges from 380 nm to 780 nm and the response speed is not more than 20 ns (nanosecond).

After the photodiode 12 generates the current, the current can be output.

The driving circuit 13 can be connected in series with the photodiode 12. In an example, the driving circuit 13 can be connected with an anode of the photodiode 12, and in this case, the cathode of the photodiode 12 can be connected with the power supply 11, and the current output by the photodiode 12 can flow to the power supply 11.

Figure 3:
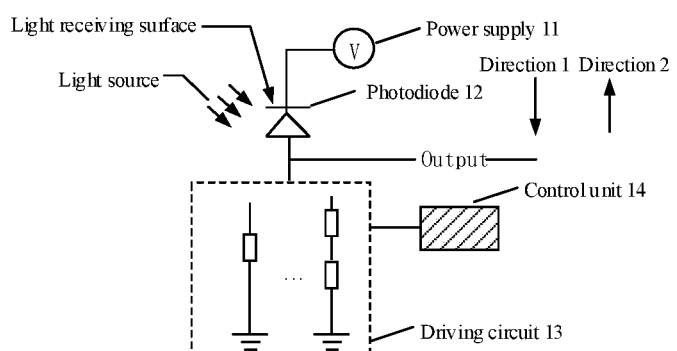
FIG. 3 is a third module schematic diagram of a detection circuit provided by an example of the present disclosure.

It should be noted that the current output from the power supply 11 flows to the photodiode 12, and a direction of the current can be shown by direction 1 in FIG. 3. The current output by the photodiode 12 flows to the power supply 11, and a direction of the current can be shown by the direction 2 in FIG. 3. Because the direction of the current output by the power supply 11 is opposite to that of the current output by the photodiode 12, the current input to the driving circuit 13 can be a difference between the current output by the power supply 11 and the current output by the photodiode 12.

Figure 2:
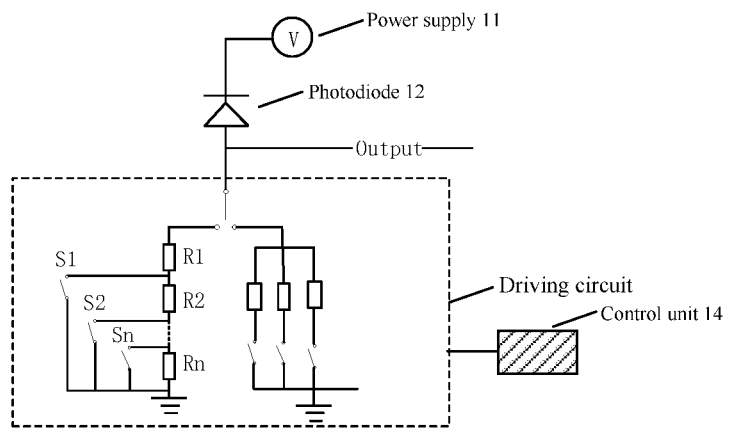
FIG. 2 is a second module schematic diagram of a detection circuit provided by an example of the present disclosure.

The driving circuit 13 may include a plurality of circuits, as illustrated by FIG. 2, the plurality of circuits have different illumination correlation coefficients. In an example of the present disclosure, the illumination correlation coefficient can indicate a corresponding relationship between a voltage generated in the circuit by the current output by the photodiode 12 based on the light source and an illumination of the light source. In one example, the illumination correlation coefficient can be used to determine the illumination of the light source according to the voltage generated in the circuit by the current output by the photodiode 12 based on the light source.

For example, the voltage generated in the circuit by the current output by the photodiode 12 based on the light source can be 0.9V, and the illumination correlation coefficient set by the circuit can be 1000 lx/V, so it can be determined that the illumination of the light source is 0.9V*1000 lx/V=900 lx.

In an example, for the resistive components with different resistance values or equivalent resistance values, the illumination correlation coefficient between the same voltage and illumination may be different. Therefore, in an example of the present disclosure, the resistance value or equivalent resistance value of the resistive component in each circuit of the driving circuit 13 can be determined first, and then the illumination correlation coefficient of each circuit of the driving circuit 13 can be set according to a calibration device, such as a standard illumination meter.

For example, if the resistance value of the resistive component of one circuit in the driving circuit 13 is set as 10 KΩ, the illumination correction coefficient of this circuit can be calculated to be 10000 lx/v according to the standard illumination meter. The resistance value of the resistive component of one circuit in the driving circuit 13 can be set as 100 KΩ, and the illumination correction coefficient of this circuit can be calculated as 1000 lx/v according to the standard illumination meter. The resistance value of the resistive component of one circuit in the driving circuit 13 can be set as 1 MΩ, and the illumination correction coefficient of this circuit can be calculated as 100 lx/V according to the standard illumination meter.

In at least one example of the present disclosure, the driving circuit 13 may be connected with the control unit 14, and the control unit 14 may select a circuit with a matched illumination correlation coefficient among the plurality of circuits of the driving circuit 13 to control the output voltage within the designate voltage range.

In an example, the control unit 14 can control at least one circuit of the driving circuit 13 to be connected with the photodiode 12. In this case, the driving circuit 13 can generate an output voltage according to the input current and the resistance value or equivalent resistance value of the resistive component in the circuit.

It should be noted that, in at least one example of the present disclosure, the control unit 14 can control one circuit in the driving circuit 13 to be connected with the photodiode 12, and can also control multiple circuits in the driving circuit 13 to be connected with the photodiode 12 at the same time, which are not limited in the example of the present disclosure. In the case where the circuits communicated with the photodiode 12 are different, the driving circuit 13 generates different output voltages based on the resistive components in the different circuits and the input currents.

In at least one example of the present disclosure, as illustrated by FIG. 3, the control unit 14 may also be connected with the photodiode 12 and control a light receiving surface of the photodiode 12 to sample an optical signal of the light source. In an example, the control unit 14 may first determine sampling parameters, and then control the light receiving surface of the photodiode to receive light according to the predetermined sampling parameters. The sampling parameters include a sampling period and a sampling number.

In at least one example of the present disclosure, the resistance value or the equivalent resistance value of each circuit of the driving circuit 13 is different.

In at least one example of the present disclosure, upon the photodiode outputting a current based on the light source, the output voltage can be generated based on the current output by the photodiode, the current output by the power supply and the resistive component in the driving circuit, and then, the control unit can select the circuit with the matched illumination correlation coefficient from the driving circuit to control the output voltage within the designate voltage range. Upon light source flicker existing, there will be a periodic change in the measured values of the voltage in multiple measurements in one sampling period. Therefore, the light source flicker can be detected based on the change of the voltage value determined by the light source, thus achieving the detection of light source flicker.

Figure 4:
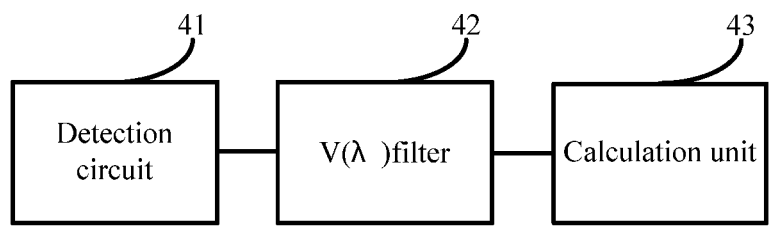
FIG. 4 is a first module schematic diagram of a device for detecting light source flicker provided by an example of the present disclosure.

Refer to FIG. 4, FIG. 4 is a first module schematic diagram of a device for detecting light source flicker provided by an example of the present disclosure. As illustrated by FIG. 4, the circuit includes the following modules: a detection circuit 41, a V(λ) filter 42 and a calculation unit 43.

In at least one example of the present disclosure, the V(λ) filter 42 may be disposed in front of the light receiving surface of the photodiode 12 in the detection circuit 41 to filter the light source before the photodiode 12 receives light.

In at least one example of the present disclosure, the detection circuit 41 may be connected with the calculation unit 43 and input the generated voltage to the calculation unit 43, and the calculation unit 43 may determine a light source flicker parameter for characterizing the light source according to the output voltage of the driving circuit 13 of the detection circuit 41.

In at least one example of the present disclosure, the light source flicker parameter may include a flicker percentage and/or a flicker index.

In the case where the light source flicker parameter includes the flicker percentage, the calculation unit 43 may calculate the flicker percentage corresponding to the light source according to a formula shown below.

The flicker percentage (%)=($Ex\_max-Ex\_min$)/($Ex\_max+Ex\_min$), where $Ex\_max$ is a maximum illumination value of the light source measured in one detection period, and $Ex\_min$ is a minimum illumination value of the light source measured in the same detection period.

In the case where the light source flicker parameter includes a flicker index, the calculation unit 43 may calculate the flicker index corresponding to the light source according to the formula shown below.

Flicker index=$\Sigma Ex\_u/\Sigma(Ex\_u-Ex\_l)$, where $Ex\_u$ is an illumination value higher than an average illumination value measured in one detection period, $Ex\_l$ is an illumination value lower than the average illumination value measured in the same detection period, and the average illumination value can be an average of all illumination values measured in the same detection period.

Upon calculating the frequency of the light source, the calculation unit 43 can calculate the frequency of the light source according to the voltage value output by the detection circuit 41 through the prior art, such as Fourier transform.

Figure 5:
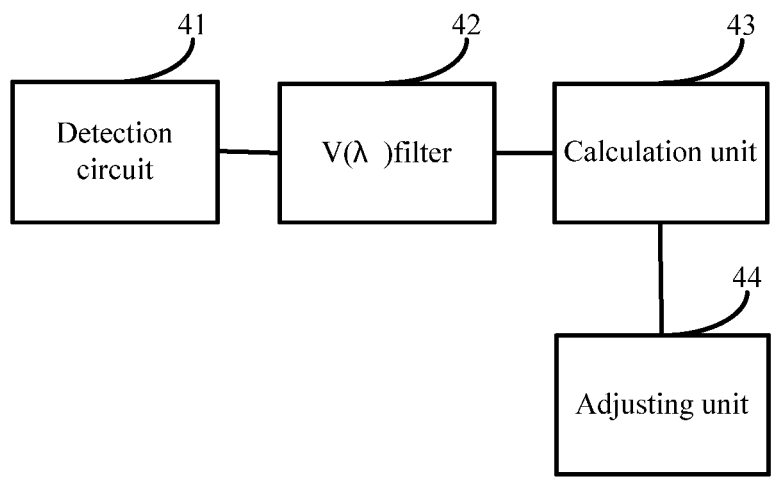
FIG. 5 is a second module schematic diagram of a device for detecting light source flicker provided by an example of the present disclosure.

In at least one example of the present disclosure, as illustrated by FIG. 5, the device for detecting light source flicker may further include an adjustment unit 44, the adjustment unit 44 may be connected with the calculation unit 43 and the photodiode 12 in the detection circuit 41, and adjust the sampling parameters of the light source of the photodiode 12 based on the light source flicker parameter output by the calculation unit 43.

In the examples of the present disclosure, the light source detected by the detection circuit can be filtered by the V(λ) filter, and then the light source flicker parameter for characterizing the light source can be determined by a calculation unit according to the output voltage of the driving circuit of the detection circuit, thereby achieving the detection of the light source flicker based on the determined parameters.

Figure 6:
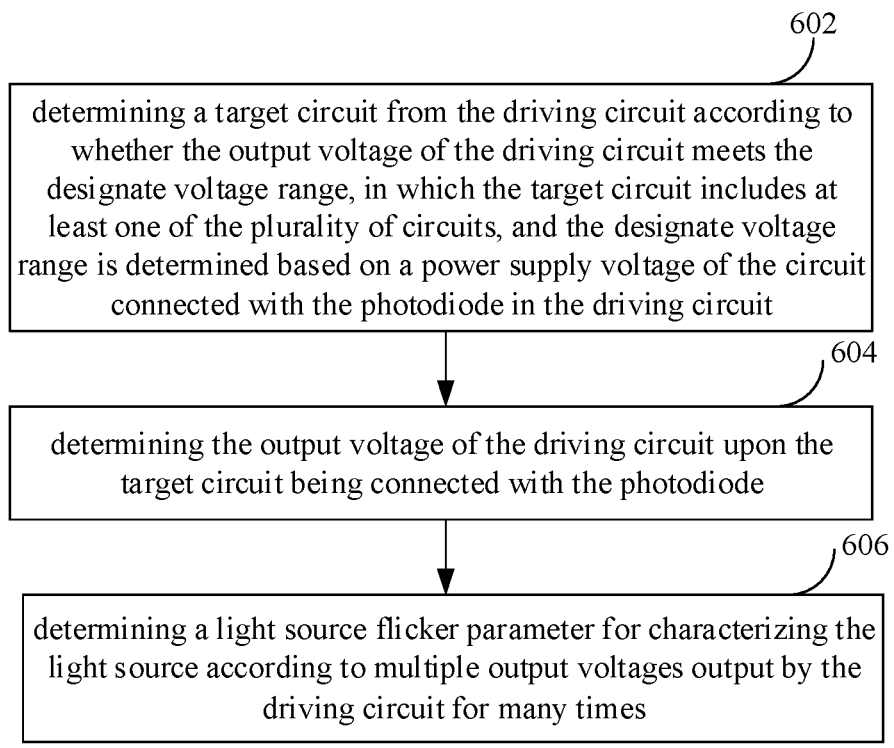
FIG. 6 is a schematic flow chart of a method for detecting light source flicker provided by an example of the present disclosure.

Refer to FIG. 6, FIG. 6 is a schematic flow chart of a method for detecting light source flicker provided by an example of the present disclosure. As illustrated by FIG. 6, the method includes the following steps.

Step 602: determining a target circuit from the driving circuit according to whether the output voltage of the driving circuit meets the designate voltage range, in which the target circuit includes at least one of the plurality of circuits, and the designate voltage range is determined based on a power supply voltage of the circuit connected with the photodiode in the driving circuit.

Step 604: determining the output voltage of the driving circuit upon the target circuit being connected with the photodiode.

Step 606: determining a light source flicker parameter for characterizing the light source according to multiple output voltages output by the driving circuit for many times.

In the examples of the present disclosure, the target circuit can be determined from the driving circuit according to whether the output voltage of the driving circuit meets the designate voltage range. The driving circuit includes a plurality of circuits, and the resistance values or equivalent resistance values of the resistive components in different circuits are different.

In at least one example, the plurality of circuits can be preset in the driving circuit, the equivalent resistance values of the resistive components of the plurality of circuits are different. For example, two circuits can be preset, including a circuit 1 and a circuit 2; the circuit 1 can include one resistive component with a resistance value of 10 KΩ, so the resistance value of the resistive component of circuit 1 can be determined as 10 KΩ. The circuit 2 may include two resistive components connected in series, and the resistance values of the two resistive components are 10 KΩ and 5 KΩ respectively, so the equivalent resistance value of the resistive components of the circuit 2 can be determined as 15 KΩ.

In at least one example of the present disclosure, the photodiode can sample an optical signal of the light source and convert the optical signal as sampled into an electrical signal, so as to form a current. Then, the photodiode can output the current to the power supply, and the power supply can output a current to the photodiode at the same time. A part of the current output by the power supply can be used to "offset" the current output by the photodiode, while the other part of the current output by the power supply can be input into the driving circuit through the photodiode.

The current input into the driving circuit can generate a voltage on the resistive component of the driving circuit, and then the target circuit can be determined from the driving circuit according to whether the output voltage of the driving circuit meets the designate voltage range. The designated voltage range is determined based on the power supply voltage of the circuit connected with the photodiode in the driving circuit.

In an example, if the power supply voltage of the circuit connected with the photodiode in the driving circuit is $V_{power}$, the designate voltage range can be set to $\{V_{low},$ $V_{high}$}, where $V_{high}$ can be set to $0.9V_{power}$ or $1V_{power}$; $V_{low}$ can be set to (0.01 to 0.001) $V_{high}$.

For example, the power supply voltage $V_{power}$ of the circuit connected with the photodiode in the driving circuit is set to 10V, the $V_{high}$ is set to $0.9V_{power}$, i.e., 9V, and the $V_{low}$ is set to $0.005V_{high}$, i.e., 0.0045V, and the designate voltage range is set to {0.0045V, 9V}.

After determining the designate voltage range, it can be determined whether the output voltage of the driving circuit meets the designate voltage range, that is, it can be determined whether the output voltage of the driving circuit falls within the designate voltage range. Upon the determined voltage value meeting the designate voltage range, the output voltage of the driving circuit can be determined upon the target circuit being connected with the photodiode, and the light source flicker parameter for characterizing the light source can be determined according to the output voltage of the driving circuit.

In at least one example of the present disclosure, during determining the target circuit from the driving circuit according to whether the output voltage of the driving circuit meets the designate voltage range, at least one of the plurality of circuits can be sequentially selected from the driving circuit to be connected with photodiode, and the output voltage of the driving circuit can be acquired. Upon the voltage of the driving circuit meeting the designate voltage range, the circuit connecting the photodiode in the driving circuit is determined as the target circuit.

In an example, at least one of the plurality of circuits can be selected from the driving circuit to be connected with the photodiode and the output voltage of the driving circuit is acquired, and then it can be determined whether the output voltage of the driving circuit meets the designate voltage range, if yes, the at least one of the plurality of circuits can be determined as the target circuit; if not, another circuit can be selected to be connected with the photodiode and the output voltage of the driving circuit is acquired. Then, it can be determined whether the output voltage of the driving circuit meets the designate voltage range; if yes, the newly selected circuit can be determined as the target circuit. If not, the selection can be continued until the target circuit is determined from the driving circuit.

In at least one example of the present disclosure, upon the output voltage of the driving circuit not meeting the designate voltage range, a candidate circuit can be determined from other circuits according to the resistance value or equivalent resistance value of the resistive component for generating the voltage value and the resistance values or equivalent resistance values of the resistive components of other circuits, and the other circuits can be at least one circuit except the circuit connected with the photodiode.

Specifically, upon the output voltage of the driving circuit exceeding the designate voltage range, a first candidate circuit can be determined from other circuits according to the resistance value or equivalent resistance value of the resistive component for generating the voltage value and the resistance values or equivalent resistance values of the resistive components of other circuits, and the equivalent resistance value of the resistive component of the first candidate circuit is smaller than that of the resistive component for generating the voltage value.

For example, upon the circuit 1 in the driving circuit being connected with the photodiode, the output voltage of the driving circuit can exceed the designate voltage range, in which the resistance value of the resistive component of the circuit 1 is 100 KΩ, and the first candidate circuit can be determined from other circuits, including circuit 2 and circuit 3, in which the resistance value of the resistive component of the circuit 2 is 10 KΩ and the equivalent resistance value of the resistive component of the circuit 3 is 1 MΩ, then the circuit 2 can be determined as the first candidate circuit.

Correspondingly, upon the output voltage of the driving circuit exceeding the designate voltage range, a second candidate circuit can be determined from other circuits according to the resistance value or equivalent resistance value of the resistive component for generating the voltage value and the resistance values or equivalent resistance values of the resistive components of other circuits, in which the equivalent resistance value of the resistive component of the second candidate circuit is smaller than that of the resistive component generating the voltage value.

For example, upon the circuit 2 in the driving circuit being connected with the photodiode, the output voltage of the driving circuit can be lower than the designate voltage range, in which the resistance value of the resistive component of the circuit 2 is 100 KΩ, and the second candidate circuit can be determined from other circuits, including the circuit 2 and the circuit 3, in which the resistance value of the resistive component of the circuit 2 is 10 KΩ and the equivalent resistance value of the resistive component of the circuit 3 is 1 MΩ, and then the circuit 3 can be determined as the second candidate circuit.

After the candidate circuits are determined, at least one circuit can be sequentially selected from the candidate circuits to be connected with the photodiode, and the output voltage of the driving circuit can be acquired. Upon the output voltage of the driving circuit meeting the designate voltage range, the circuit connected with the photodiode in the driving circuit can be determined as the target circuit.

It should be noted that, upon light source signal detected by the detection circuit being relatively strong, the current generated by the photodiode based on the light source is also relatively large. If the relatively large current exceeds the current output by the power supply of the circuit connected with the photodiode in the driving circuit, the current output by the power supply will be basically "offset". In this case, there will be no current or a very small current flowing into the driving circuit. If the resistance value or equivalent resistance value of the resistive component in the current circuit connected with photodiode is small, the driving circuit can only output a small voltage, which is lower than the voltage detection range, resulting in that the detected voltage value is not accurate. Because it is needed to determine the detection value of light source flicker of target light source according to the detected voltage value, if the detected voltage value is not accurate, it will probably lead to the subsequent detection value inaccurate, thus making the detection result of light source flicker of target light source inaccurate.

In at least one example of the present disclosure, a plurality of circuits can be arranged, and the equivalent resistance values of the resistive components in the plurality of circuits are different. Upon the electric signal corresponding to the light source being relative strong, the circuit including the resistive component with relatively large resistance value or equivalent resistance value can be selected from the driving circuit. Because the equivalent resistance value of the resistive component in the circuit is relatively large, the output voltage of the driving circuit is relatively large and will not be lower than the voltage detection range. In this case, the voltage generated by the detected electrical signal on the resistive component is consistent with a real voltage generated by the electrical signal on the resistive component. Therefore, the light source flicker parameter for characterizing the light source is determined according to the detected voltage value, and the determined detection parameter is more accurate. Accordingly, the detection result of the light source flicker of the light source based on the detection parameter has higher accuracy.

In at least one example of the present disclosure, after acquiring the multiple output voltages output by the driving circuit for many times, the light source flicker parameter can be determined according to the multiple output voltages output by the driving circuit for many times, specifically, the multiple output voltages output by the driving circuit for many times in one detection period can be acquired, and the light source flicker parameter can be determined according to the multiple output voltages output by the driving circuit for many times in this detection period.

In at least one example, the illumination correction coefficient of the target circuit can be determined first, and then a plurality of illuminations of the light source can be determined according to the illumination correction coefficient and the multiple output voltages output by the driving circuit for many times, and the light source flicker parameter can be determined according to the plurality of illuminations of the light source. Because these contents have been described in detail in the above examples, and the repeated portions are omitted in the present example.

After determining the plurality of illuminations of the light source, the light source flicker parameter for characterizing the light source can be determined according to the plurality of illuminations.

In at least one example, the light source flicker parameter for characterizing the light source may include a frequency of the light source, and a flicker percentage and/or a flicker index of the light source.

In an example, upon determining the light source flicker parameter according to the plurality of illuminations of the light source, the flicker percentage and/or flicker index of the light source can be determined according to the plurality of illuminations of the light source.

Because the specific process of determining the flicker percentage and/or flicker index of the light source according to the plurality of illuminations of the light source has been described in detail in the above examples, and the repeated portions are omitted in the example of the present disclosure.

In at least one example of the disclosure, an effective frequency value range can be determined according to the sampling parameters of the photodiode to the light source. The sampling parameters can include a sampling period and a sampling number.

In an example, an maximum frequency in the effective frequency range can be determined according to the sampling period in the sampling parameters, and a total sampling time can be determined according to the sampling period and sampling number in the sampling parameters, and a minimum frequency in the effective frequency range can be determined based on the total sampling time as determined.

For example, the sampling parameters can include: if the sampling period is 25 μs and the sampling number is 1024, the total sampling time can be determined as a product 25.6 ms of the sampling period and the sampling number, and the minimum frequency in the effective frequency range can be 1/25.6 ms=39 Hz. Considering that at least two signals should be collected in one sampling period, the maximum frequency in the effective frequency range can be 1/50 μs=20 KHz, and thus the effective frequency range can be determined as {39 Hz, 20 KHz}.

After determining the effective frequency range, the frequency of the light source can be determined. In an example, the frequency of the light source can be determined according to the output voltage of the driving circuit through the prior art, such as Fourier transform.

After determining the effective frequency range, it can be determined whether the frequency value of the target light source meets the above determined effective frequency range. Upon the frequency value of the light source meeting the above determined effective frequency range, the target circuit can be determined from the driving circuit according to whether the output voltage of the driving circuit meets the designate voltage range.

In at least one example of the present disclosure, upon the frequency of the light source not meeting the effective frequency range, the sampling parameters are adjusted according to the frequency of the light source and the effective frequency range.

Specifically, upon the frequency value of the light source exceeding the effective frequency range, the value of the sampling period in the sampling parameters can be reduced; upon the frequency of the light source being lower than the effective frequency range, the value of the sampling number in the sampling parameters can be increased.

After adjusting the values of the sampling parameters, the optical signal of the light source can be sampled according to the adjusted values of the sampling parameters, and the sampled optical signal can be converted into an electrical signal to form a current, which is input into the driving circuit, so that the driving circuit outputs voltage based on the circuit, and the driving circuit can determine the light source flicker parameter based on the output voltage of the circuit.

In at least one example of the present disclosure, the target circuit can be determined from the driving circuit according to whether the output voltage of the driving circuit meets the designate voltage range, the target circuit includes at least one of the plurality of circuits. The designate voltage range is determined based on the power supply voltage of the circuit connected with the photodiode in the driving circuit. The voltage output by the driving circuit is determined upon the target circuit is connected with the photodiode, and the light source flicker parameter for characterizing the light source is determined according to the output voltage of the driving circuit.

It can be seen from the above that, in at least one example of the present disclosure, the voltage conforming to the effective voltage range can be generated by the preset resistive components of the plurality of circuits and the current input to the driving circuit, so that the detection result for the voltage value is more accurate, and then the light source flicker parameter for characterizing the light source is determined according to the follow-up detected voltage value, and the determined detection parameter is more accurate. Accordingly, the detection result of the light source flicker of the light source based on the detection parameter is also more accurate.

Figure 7:
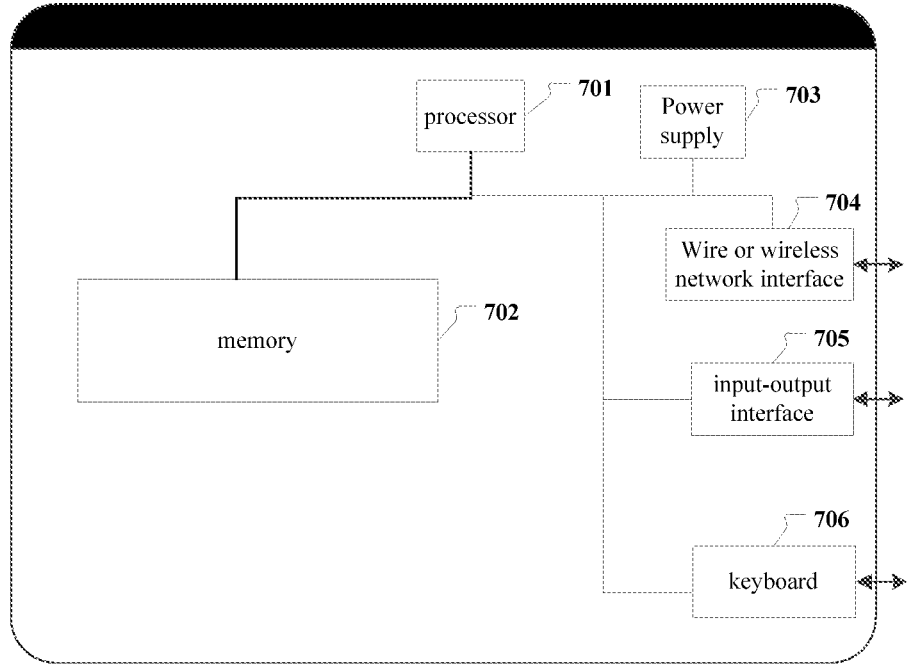
FIG. 7 is a schematic structural diagram of a photoelectric detection device provided by an example of the present disclosure.

In an example, at least one example of the present disclosure further provides a photoelectric detection device. FIG. 7 is a schematic structural diagram of a photoelectric detection device provided by an example of the present disclosure. As illustrated by FIG. 7, the device includes a memory 702, a processor 701, a power supply 703 and a wire or wireless network interface 704. The memory 702, the processor 701 and the wire or wireless network interface 704 are communicated through the power supply 703, and the wire or wireless network interface 704 may include an input-output interface including but not limited to a keyboard, a mouse, a display, a microphone, a loudspeaker, and the like.

In FIG. 7, the memory 702 stores computer-executable instructions that can be executed on the processor 701. Upon the computer-executable instructions being executed by the processor 701, the following processes are implemented: determining a target circuit from the driving circuit according to whether the output voltage of the driving circuit meets a designate voltage range, in which the target circuit comprises at least one of the plurality of circuits, and the designate voltage range is determined based on a power supply voltage of a circuit connected with the photodiode in the driving circuit; and determining the output voltage of the driving circuit upon the target circuit being connected with the photodiode; and determining the light source flicker parameter for characterizing the light source according to multiple output voltages output by the driving circuit for many times.

In at least one example, upon the computer-executable instructions being executed by the processor 701, determining the target circuit from the driving circuit according to whether the output voltage of the driving circuit meets the designate voltage range includes: sequentially selecting at least one of the plurality of circuits from the driving circuit to be connected with the photodiode, and acquiring the output voltage of the driving circuit; determining a circuit connected with the photodiode in the driving circuit as the target circuit upon the output voltage of the driving circuit meeting the designate voltage range; and continuously trying to select a next one of the plurality of circuits from the driving circuit to be connected with the photodiode upon the output voltage of the driving circuit not meeting the designate voltage range.

In at least one example, upon the computer executable instructions being executed by the processor 701, sequentially selecting at least one of the plurality of circuits from the driving circuit to be connected with the photodiode, and acquiring the output voltage of the driving circuit includes: sequentially selecting at least one of the plurality of circuits from the driving circuit to be connected with the photodiode according to resistance values or equivalent resistance values of the plurality of circuits in the driving circuit, and acquiring the output voltage of the driving circuit.

In at least one example, upon the computer-executable instructions being executed by the processor 701, determining the light source flicker parameter for characterizing the light source according to the multiple output voltages output by the driving circuit for many times includes: determining an illumination correction coefficient of the target circuit; determining a plurality of illuminations of the light source according to the illumination correction coefficient and the multiple output voltages output by the driving circuit for many times; determining the light source flicker parameter for characterizing the light source according to the plurality of illuminations of the light source.

In at least one example, upon the computer executable instructions being executed by the processor 701, the light source flicker parameter for characterizing the light source includes a flicker percentage and/or a flicker index of the light source, and determining the light source flicker parameter according to the plurality of illuminations of the light source includes: determining the flicker percentage and/or the flicker index of the light source according to the plurality of illuminations of the light source.

In at least one example, upon the computer executable instructions being executed by the processor 701, determining the target circuit from the driving circuit according to whether the output voltage of the driving circuit meets the designate voltage range includes: determining an effective frequency range; the effective frequency range is determined according to the sampling parameters of the light source; determining the target circuit from the driving circuit according to whether the output voltage of the driving circuit meets the designate voltage range upon a frequency of the light source meeting the effective frequency range; adjusting the sampling parameters upon the frequency of the light source not meeting the effective frequency range, and sampling an optical signal of the light source according to the sampling parameters as adjusted.

In at least one example, upon the computer executable instructions being executed by the processor 701, adjusting the sampling parameters upon the frequency of the light source not meeting the effective frequency range includes: reducing a sampling period in the sampling parameters upon the frequency of the light source exceeding the effective frequency range; increasing a sampling number in the sampling parameters upon the frequency of the light source being lower than the effective frequency range.

In the present example, the target circuit can be determined from the driving circuit according to whether the output voltage of the driving circuit meets the designate voltage range, the target circuit includes at least one of the plurality of circuits. The designate voltage range is determined based on the power supply voltage of the circuit connected with photodiode in the driving circuit. The output voltage of the driving circuit is determined upon the target circuit being connected with the photodiode, and the light source flicker parameter is determined according to the output voltage of the driving circuit.

It can be seen from the above that, in the example of the present disclosure, the voltage conforming to the effective voltage range can be generated by the preset resistive components of the multiple circuits and the current input to the driving circuit, so that the detection result for the voltage value is more accurate, and then the light source flicker parameter for characterizing the light source is determined according to the detected voltage value, and the determined detection parameter is also more accurate. Accordingly, the accuracy of the detection result of the light source flicker of the light source based on the detection parameter is also high.

It should be noted that the photoelectric detection device in the example of the present disclosure can achieve each process of the above method for detecting the light source flicker, and achieve the same effects and functions, and the repeated portions are omitted herein.

In an example, at least one example of the present disclosure further provides a computer-readable storage medium, which is used to store computer-executable instructions, and upon being executed by a processor, the computer-executable instructions can implement each process of the above method for detecting the light source flicker, and the same effects and functions are achieved, and the repeated portions are omitted herein.

The computer readable storage medium includes a Read-Only Memory (ROM), a Random Access Memory (RAM), a magnetic disk or an optical disk, etc.

Figure 8:
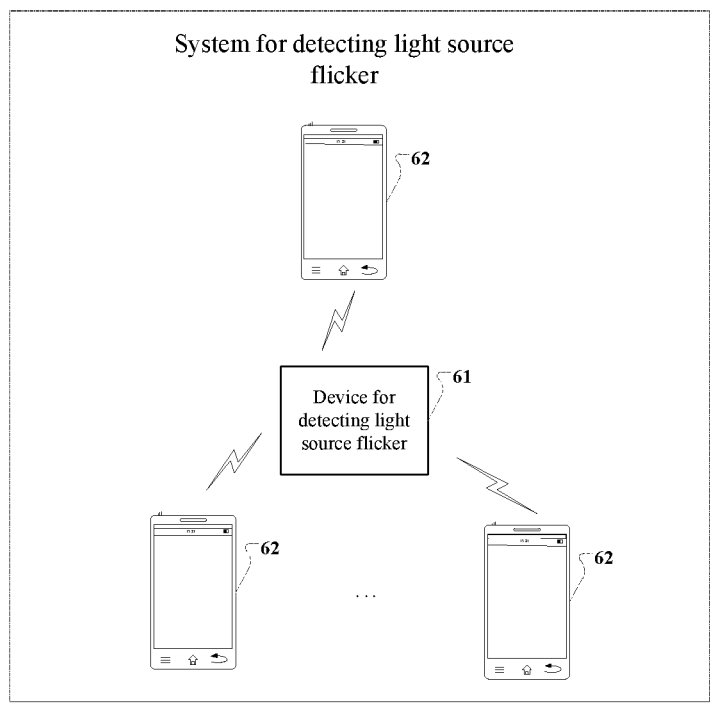
FIG. 8 is a schematic diagram of a system for detecting light source flicker provided by an example of the present disclosure.

Refer to FIG. 8, FIG. 8 is a schematic diagram of a system for detecting light source flicker provided by an example of the present disclosure. As illustrated by FIG. 8, the system includes a device for detecting light source flicker 61 and a terminal device 62, an application program for communicating with the device for detecting light source flicker 61 is deployed on the terminal device 62.

In at least one example of the present disclosure, the terminal device can communicate with the device for detecting light source flicker, acquire the light source flicker parameter, as determined by the device for detecting light source flicker, and display the acquired parameter, so that the user can view the parameter and intuitively perceive the light source flicker of the light source according to the parameter.

Examples of the present disclosure provide a detection circuit, a device and method for detecting light source flicker, and a photoelectric detection device, so as to achieve the detection of light source flicker.

The present disclosure provides: in a first aspect, a detection circuit is provided, which includes a power supply; a photodiode configured to output a current based on a light source; a driving circuit connected in series with the photodiode and configured to generate an output voltage based on the current output by the photodiode, a current output by the power supply, and a resistive component, the driving circuit includes a plurality of circuits with different illumination correlation coefficients; and a control unit connected with the driving circuit and configured to select a circuit with a matched illumination correlation coefficient from the driving circuit to control the output voltage within a designate voltage range.

In a second aspect, a device for detecting light source flicker is provided, which includes the detection circuit according to the first aspect; a V(λ) filter arranged on a light receiving surface of the photodiode of the detection circuit and configured to filter the light source detected by the detection circuit; and a calculation unit configured to determine a light source flicker parameter for characterizing the light source according to the output voltage of the driving circuit of the detection circuit.

In a third aspect, a method for detecting light source flicker is provided, which is applied to the device described in the second aspect, and the method includes: determining a target circuit from the driving circuit according to whether the output voltage of the driving circuit meets the designate voltage range, in which the target circuit includes at least one of the plurality of circuits, and the designate voltage range is determined based on a power supply voltage of a circuit connected with the photodiode in the driving circuit; determining the output voltage of the driving circuit upon the target circuit being connected with the photodiode; and determining a light source flicker parameter for characterizing light source according to the output voltage of the driving circuit.

In a fourth aspect, a photoelectric detection device is provided, which includes a memory, a processor and a computer program stored on the memory and operable on the processor, in which the computer program, upon being executed by the processor, implements the method according to the abovementioned third aspect.

In a fifth aspect, a computer-readable storage medium is provided, a computer program is stored on the computer-readable storage medium, upon being executed by a processor, implements the method according to the abovementioned third aspect.

In a sixth aspect, a system for detecting light source flicker is provided, which includes the device described in the abovementioned second aspect and a terminal device, and the terminal device is deployed with an application program for communicating with the device described in the abovementioned second aspect.

In the 1990s, the improvement of a technology can be clearly distinguished as hardware improvement (for example, improvement of a circuit structure such as a diode, a transistor or a switch) or software improvement (improvement of method flow). However, with the development of technology, the improvement of many methods and processes can be regarded as the direct improvement of a hardware circuit structure. Designers almost all get the corresponding hardware circuit structure by programming the improved method flow into the hardware circuit. Therefore, it cannot be said that the improvement of a method flow cannot be realized by a hardware entity module. For example, a Programmable Logic Device (PLD) (such as a Field Programmable Gate Array (FPGA)) is such an integrated circuit, and its logic function is determined by the user programming the device. A digital system is "integrated" on a PLD by the designer's own programming, without requiring a chip manufacturer to design and manufacture a special integrated circuit chip. Moreover, nowadays, instead of manually making integrated circuit chips, this kind of programming is mostly realized by using "logic compiler" software, which is similar to the software compiler used in program development and writing, and an original code before compiling must be written in a specific programming language, which is called as Hardware Description Language (HDL). There is not only one HDL, but many kinds of HDL. For example, ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language) and so on. At present, VHDL (Very-High-Speed Integrated Circuit Hardware Description Language) and Verilog are the most commonly used. It should be clear to those skilled in the art that the hardware circuit for realizing the logic method flow can be easily acquired only by slightly programming the method flow with the above-mentioned hardware description languages and programming it into the integrated circuit.

The controller can be implemented in any suitable manner. For example, the controller can take the form of, for example, a microprocessor or a processor and a computer readable medium storing computer readable program code (such as software or firmware) executable by the (micro) processor, logic gates, switches, application specific integrated circuits (ASIC), a programmable logic controller and an embedded microcontroller. Examples of controllers include but are not limited to the following microcontrollers: ARC 625D, Atmel AT91SAM, Microchip PIC18F26K20 and Silicone Labs C8051F320; the memory controller can also be implemented as a part of the control logic of the memory. Those skilled in the art also know that, in addition to realizing the controller in the form of pure computer readable program code, it is possible to make the controller realize the same functions in the form of logic gates, switches, application specific integrated circuits, programmable logic controllers, embedded microcontrollers, etc. by logically programming the method steps. Therefore, this controller can be regarded as a hardware component, and the devices included in it for realizing various functions can also be regarded as the structure within the hardware component. Or even, the means for realizing various functions can be regarded as both a software module for realizing the method and a structure within a hardware component.

The systems, devices, modules or units illustrated in the above examples can be realized by computer chips or entities, or by products with certain functions. A typical implementation device is a computer. Specifically, the computer can be, for example, a personal computer, a laptop computer, a cellular phone, a camera phone, a smart phone, a personal digital assistant, a media player, a navigation device, an email device, a game console, a tablet computer, a wearable device or a combination of any of these devices.

For the convenience of description, upon the above devices being described, the functions are divided into various units. Of course, upon the present disclosure being implemented, the functions of each unit can be implemented in one or more pieces of the software and/or the hardware.

It should be understood by those skilled in the art that examples of the present disclosure may be provided as methods, systems, or computer program products. Therefore, the present disclosure may take the form of an entirely hardware example, an entirely software example, or an example combining the software and the hardware aspects. Furthermore, the present disclosure may take the form of a computer program product embodied on one or more computer available storage media (including but not limited to a disk memory, a CD-ROM, an optical memory, etc.) having computer available program codes embodied therein.

The present disclosure is described with reference to flowcharts and/or block diagrams of methods, devices (systems), and computer program products according to examples of the present disclosure. It should be understood that each flow and/or block in the flowchart and/or block diagram, and combinations of flows and/or blocks in the flowchart and/or block diagram can be implemented by computer program instructions. These computer program instructions may be provided to a processor of a general purpose computer, a special purpose computer, an embedded processor or other programmable data processing apparatus to produce a machine, such that the instructions which are executed by the processor of the computer or other programmable data processing apparatus produce means for implementing the functions specified in one or more flow diagrams and/or one or more block diagrams.

These computer program instructions may also be stored in a computer-readable memory that can guide a computer or other programmable data processing apparatus to operate in a specific manner, such that the instructions stored in the computer-readable memory produce a manufactured article including an instruction device that implement the functions specified in one or more flows of the flowchart and/or one or more blocks of the block diagram.

These computer program instructions may also be loaded onto a computer or other programmable data processing device, such that a series of operational steps are performed on the computer or other programmable device to produce a computer-implemented process, such that the instructions which execute on the computer or other programmable device provide steps for implementing the functions specified in one or more flow diagrams and/or one or more block diagrams.

In a typical configuration, a computing device includes one or more processors (CPUs), input/output interfaces, network interfaces, and memory.

The memory may include a non-permanent memory, a random access memory (RAM) and/or a nonvolatile memory in the computer readable media, such as a read-only memory (ROM) or a flash RAM. The memory is an example of a computer-readable medium.

Computer-readable media, including permanent and non-permanent, removable and non-removable media, can store information by any method or technology. Information can be computer readable instructions, data structures, modules of programs, or other data. Examples of storage media for computers include, but not limited to a phase change random access memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital video disc (DVD) or other optical storage, magnetic cassettes, magnetic tape, magnetic disk storage or other magnetic storage devices or any other non-transmission medium which can be used to store information that can be accessed by computing devices. As defined herein, the computer-readable media does not include temporary storage computer-readable media, such as modulated data signals and carrier waves.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

It should also be noted that the terms "comprising", "including" or any other variant thereof are intended to cover non-exclusive inclusion, so that a process, method, commodity or device including a series of elements not only includes those elements, but also includes other elements not explicitly listed, or also includes elements inherent to such process, method, commodity or device. Without further restrictions, the elements defined by the sentence "including a . . . " do not exclude the existence of other identical elements in the process, method, commodity or device including the elements.

It should be understood by those skilled in the art that examples of the present disclosure may be provided as methods, systems or computer program products. Therefore, the present disclosure may take the form of an entirely hardware example, an entirely software example or an example combining the software and the hardware aspects. Furthermore, the present disclosure may take the form of a computer program product embodied on one or more computer available storage media (including but not limited to a disk memory, a CD-ROM, an optical memory, etc.) having computer available program codes embodied therein.

The present disclosure may be described in the general context of computer-executable instructions, such as program modules, executed by a computer. Generally, program modules include routines, programs, objects, components, data structures, etc. that perform specific tasks or implement specific abstract data types. The present disclosure can also be practiced in distributed computing environments where tasks are performed by remote processing devices connected through a communication network. In the distributed computing environments, program modules can be located in local and remote computer storage media including storage devices.

All the examples in this specification are described in a progressive way, and the same and similar parts among the examples can be referred to each other. Each example focuses on the differences from other examples. Especially, for the system example, because it is basically similar to the method example, the description is relatively simple, and relevant points can be found in the partial description of the method example.

The above are only examples of the present disclosure, and are not intended to limit the present disclosure. For those skilled in the art, various modifications and variations of the present disclosure are possible. Any modification, equivalent substitution, improvement, etc. made within the spirit and principle of the present disclosure shall be included within the scope of the present disclosure.

The invention claimed is:

1. A detection circuit, comprising:
a power supply;
a photodiode configured to output a current based on a light source;
a driving circuit connected in series with the photodiode and configured to generate an output voltage based on the current output by the photodiode, a current output by the power supply, and a resistive component, wherein the driving circuit comprises a plurality of circuits with different illumination correlation coefficients; and
a control unit connected with the driving circuit and configured to select a circuit with a matched illumination correlation coefficient from the driving circuit to control the output voltage within a designated voltage range.

2. The detection circuit according to claim 1, wherein the control unit is further connected with the photodiode and configured to control a light receiving surface of the photodiode to sample an optical signal of the light source according to predetermined sampling parameters; and the sampling parameters comprise a sampling period and a sampling number.

3. The detection circuit according to claim 1, wherein a resistance value or an equivalent resistance value of each of the plurality of circuits in the driving circuit is different.

4. The detection circuit according to claim 1, wherein the photodiode comprises a photodiode with a spectral response wavelength ranging from 380 nm to 780 nm and a response speed being not more than 100 nanoseconds.

5. A device for detecting light source flicker, comprising:
a detection circuit that comprises:
a power supply,
a photodiode configured to output a current based on a light source,
a driving circuit connected in series with the photodiode and configured to generate an output voltage based on the current output by the photodiode, a current output by the power supply, and a resistive component, wherein the driving circuit comprises a plurality of circuits with different illumination correlation coefficients, and
a control unit connected with the driving circuit and configured to select a circuit with a matched illumination correlation coefficient from the driving circuit to control the output voltage within a designated voltage range;
a V($\lambda$) filter arranged on a light receiving surface of the photodiode of the detection circuit and configured to filter the light source detected by the detection circuit; and
a calculation unit configured to determine a light source flicker parameter for characterizing the light source according to the output voltage of the driving circuit of the detection circuit.

6. The device for detecting light source flicker according to claim 5, wherein the device further comprises:
an adjusting unit connected with the calculation unit and the photodiode in the detection circuit and configured to adjust the sampling parameters of the light source of the photodiode based on the light source flicker parameter output by the calculation unit.

7. A method for detecting light source flicker, applied to a device for detecting light source flicker, comprising:
determining a target circuit from a driving circuit according to whether an output voltage of the driving circuit meets a designated voltage range, wherein the target circuit comprises at least one of a plurality of circuits, and the designated voltage range is determined based on a power supply voltage of a circuit connected with a photodiode in the driving circuit;
determining the output voltage of the driving circuit upon the target circuit being connected with the photodiode; and
determining a light source flicker parameter according to multiple output voltages output by the driving circuit for many times.

8. The method according to claim 7, wherein determining the target circuit from the driving circuit according to whether the output voltage of the driving circuit meets the designated voltage range comprises:
sequentially selecting at least one of the plurality of circuits from the driving circuit to be connected with the photodiode, and acquiring the output voltage of the driving circuit;
determining a circuit currently connected with the photodiode in the driving circuit as the target circuit upon the output voltage of the driving circuit meeting the designated voltage range; and
continuously trying to select a next one of the plurality of circuits from the driving circuit to be connected with the photodiode upon the output voltage of the driving circuit not meeting the designated voltage range.

9. The method according to claim 8, wherein sequentially selecting the at least one of the plurality of circuits from the driving circuit to be connected with the photodiode, and acquiring the output voltage of the driving circuit comprises:
sequentially selecting the at least one of the plurality of circuits from the driving circuit to be connected with the photodiode according to resistance values or equivalent resistance values of the plurality of circuits in the driving circuit, and acquiring the output voltage of the driving circuit.

10. The method according to claim 9, wherein determining the light source flicker parameter for characterizing the light source according to the multiple output voltages output by the driving circuit for many times comprises:
determining an illumination correction coefficient of the target circuit;

determining a plurality of illuminations of the light source according to the illumination correction coefficient and the multiple voltages output by the driving circuit for many times; and determining the light source flicker parameter for characterizing the light source according to the plurality of illuminations of the light source.

11. The method according to claim 10, wherein:

the light source flicker parameter for characterizing the light source comprises a flicker percentage and/or a flicker index of the light source; and determining the light source flicker parameter for characterizing the light source according to the plurality of illuminations of the light source comprises: determining the flicker percentage and/or the flicker index of the light source according to the plurality of illuminations of the light source.

12. The method according to claim 7, wherein determining the target circuit from the driving circuit according to whether the output voltage of the driving circuit meets the designated voltage range comprises:

determining an effective frequency range, wherein the effective frequency range is determined according to sampling parameters of the light source;

determining the target circuit from the driving circuit according to whether the output voltage of the driving circuit meets the designated voltage range upon a frequency of the light source meeting the effective frequency range; and adjusting the sampling parameters upon the frequency of the light source not meeting the effective frequency range, and sampling an optical signal of the light source according to the sampling parameters as adjusted.

13. The method according to claim 12, wherein adjusting the sampling parameters upon the frequency of the light source not meeting the effective frequency range comprises:

reducing a sampling period in the sampling parameters upon the frequency of the light source exceeding the effective frequency range; and increasing a sampling number in the sampling parameters upon the frequency of the light source being lower than the effective frequency range.

* * * * *